US008270928B2

(12) United States Patent
Axtmann et al.

(10) Patent No.: US 8,270,928 B2
(45) Date of Patent: Sep. 18, 2012

(54) SIGNAL ANALYSIS FOR AN IMPROVED DETECTION OF NOISE FROM AN ADJACENT CHANNEL

(75) Inventors: Olaf Axtmann, Karlsruhe (DE); Philipp Schmauderer, Höfen (DE); Christoph Benz, Ohlsbach (DE); Andreas Körner, Waldbronn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 347 days.

(21) Appl. No.: 12/777,153

(22) Filed: May 10, 2010

(65) Prior Publication Data

US 2010/0285765 A1    Nov. 11, 2010

(30) Foreign Application Priority Data

May 11, 2009   (EP) .................................. 09006348

(51) Int. Cl.
*H04B 1/10* (2006.01)
(52) U.S. Cl. ..................... 455/296; 455/295; 455/67.11; 455/67.12; 455/226.1; 455/226.2; 455/226.3; 455/226.4; 381/13
(58) Field of Classification Search .................. 455/296, 455/295, 67.11, 67.12, 226.1–226.4; 381/13
See application file for complete search history.

(56) References Cited

U.S. PATENT DOCUMENTS

| | | | |
|---|---|---|---|
| 5,307,515 A | 4/1994 | Kuo et al. | |
| 5,564,093 A | 10/1996 | Matsumoto | |
| 5,631,963 A | 5/1997 | Herrmann | |
| 5,724,001 A * | 3/1998 | Chang | 329/302 |
| 6,389,273 B1 * | 5/2002 | Brandenburg | 455/296 |
| 6,738,606 B1 | 5/2004 | Kianush et al. | |
| 7,522,896 B2 * | 4/2009 | Oshima et al. | 455/232.1 |

* cited by examiner

*Primary Examiner* — Junpeng Chen
(74) *Attorney, Agent, or Firm* — Brinks Hofer Gilson & Lione

(57) ABSTRACT

A radio receiver may determine whether a received frequency modulated radio signal includes interference from an adjacent channel. The receiver may compare a frequency deviation above the center frequency of the received signal to a frequency deviation below the center frequency of the received signal. The receiver determines that the radio signal is affected by adjacent channel noise when the frequency deviation below the center frequency is substantially different from the frequency deviation above the center frequency. Alternatively, the presence of noise from an adjacent channel may be detected by comparing a positive amplitude and a negative amplitude of a demodulated version of the frequency modulated radio signal. In this alternative, the receiver determines that the radio signal is affected by adjacent channel noise when the extent of the positive amplitude is substantially different from the extent of the negative amplitude.

23 Claims, 6 Drawing Sheets

SIGNAL ANALYSIS FOR AN IMPROVED DETECTION OF NOISE FROM AN ADJACENT CHANNEL

PRIORITY CLAIM

This application claims the benefit of priority from European Patent Application No. 09006348.8, filed May 11, 2009, which is incorporated by reference.

BACKGROUND

1. Technical Field

This application relates to signal processing and, more particularly, to detecting noise from an adjacent channel.

2. Related Art

Communication systems may use frequency modulation (FM) or amplitude modulation (AM) to transmit information to a remote party. A system using frequency modulation conveys information over a carrier wave by varying the frequency of the carrier wave. A system using amplitude modulation conveys information by varying the amplitude of the carrier wave while holding the frequency of the carrier wave constant. In some implementations, frequency modulation may be more robust than amplitude modulation against noise and interference.

The FM broadcast band may fall within the very high frequency range (VHF; in Germany: UltraKurzWelle, UKW) and other frequency ranges. The FM broadcast band may be split into channels by defining a channel spacing that leaves a buffer between channels in attempt to reduce interaction between adjacent channels. In some systems, the FM broadcast band may use a channel spacing of 100 kHz, with a 25 kHz buffer above and below the center frequency of the channel. In some systems, the bandwidth of an FM signal may actually be wider than the provided channel spacing. The bandwidth of an FM signal may be predicted according to: $BW \approx 2*(\Delta f + f_{audio})$, where $f_{audio}$ is the maximum modulating frequency and $\Delta f$ is the frequency deviation in the channel. An FM signal with a maximum modulating frequency of 15 kHz and a frequency deviation of 75 kHz would have a bandwidth of about 180 kHz. Therefore, a channel spacing of ~200 kHz or more would result in a system without overlapping frequencies of adjacent channels, but then fewer channels would be available.

Although the bandwidth of an FM signal may be wider than the provided FM channel of 100 kHz, two adjacent channels may exist without much interference as long as a sufficient distance separates the two stations. FM broadcasting has a relatively low distance range. When two channels are distant from each other, the signal energy of one channel may be too low to lead to noise in the other channel. However, an adjacent radio station may still cause interference in another signal, especially when the carrier frequencies are nearby and the signal strength of the adjacent radio channel is large enough compared to the signal strength of the signal of interest. Therefore, a need exists for a system for improved detection of noise from an adjacent channel.

SUMMARY

A radio receiver may determine whether a received frequency modulated radio signal includes interference from an adjacent channel. The receiver may compare a frequency deviation above the center frequency of the received signal to a frequency deviation below the center frequency of the received signal. The receiver determines that the radio signal is affected by adjacent channel noise when the frequency deviation below the center frequency is substantially different from the frequency deviation above the center frequency. Alternatively, the presence of noise from an adjacent channel may be detected by comparing a positive amplitude and a negative amplitude of a demodulated version of the frequency modulated radio signal. In this implementation, the receiver determines that the radio signal is affected by adjacent channel noise when the extent of the positive amplitude is substantially different from the extent of the negative amplitude.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A frequency modulated signal received on a wireless channel may include noise from an adjacent radio channel. Adjacent channel noise may interfere with the content of the received signal thereby reducing signal quality. In one system, an adjacent channel noise detector may analyze a received frequency modulated signal to identify whether the received signal includes noise from an adjacent channel. When adjacent channel noise is identified in the received signal, the adjacent channel noise detector may eliminate or dampen the adjacent channel noise from the received signal. The elimination or dampening of the adjacent channel noise may improve the perceived quality of the received signal.

Figure 1:
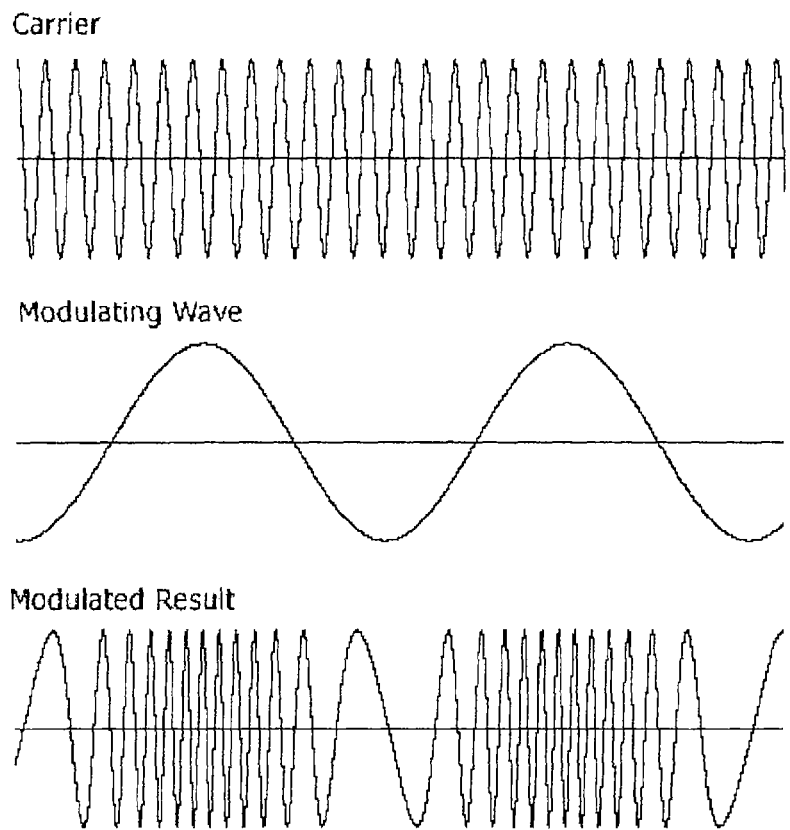
FIG. 1 illustrates a carrier wave, a modulating wave, and a frequency modulated wave.

Frequency modulation (FM) or a frequency modulator may be used to transmit information through a wireless medium. The process or system may encode information in an electrical signal by varying its frequency. FIG. 1 illustrates a carrier wave that is encoded by variation of its frequency by a modulating wave. In frequency modulation, the low frequency modulation signal (information signal) may vary the higher carrier frequency of the carrier signal to generate a frequency modulated signal. As shown, the polarity of the modulating wave may indicate whether the carrier frequency is decreased or increased, and the amplitude of the modulating wave may indicate the amount the carrier frequency varies. For example, the positive portion of the modulating wave leads to an increase of the carrier frequency, while the negative portion of the modulating wave leads to a decrease of the carrier frequency, as shown in FIG. 1.

Figure 2:
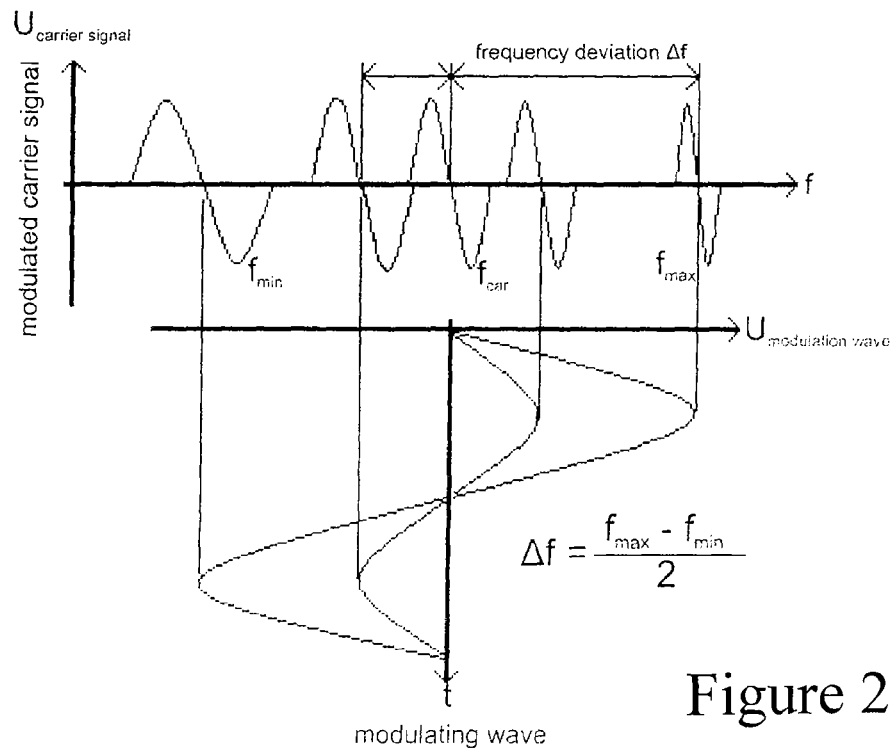
FIG. 2 illustrates a frequency modulated carrier signal and the modulating wave.

FIG. 2 illustrates a frequency modulated carrier signal and a corresponding modulating wave. A correspondence may be seen between a large or a small amplitude of the modulating signal and the resulting modulated carrier signal frequency change. FIG. 2 shows two modulating signals having different amplitudes, and the resulting modulated carrier signals. The amplitude of a modulating signal determines the amount of frequency deviation ($\Delta f$) of the carrier signal. The carrier signal continuously runs through all frequencies between the two boundary frequency values. At the zero-crossing point of the modulating wave, the un-modulated carrier frequency signal may be present for a moment.

The phrase frequency deviation ($\Delta f$) may be used in FM transmissions to describe the maximum instantaneous difference between an FM modulated frequency and the nominal carrier frequency, and thus represents a maximum shift away from the carrier frequency in one direction. The phrase is sometimes mistakenly used as synonym with the phrase frequency drift, which is an unintended offset of an oscillator from its nominal frequency.

The frequency deviation of a radio signal may control the number of channels that fit within a given frequency range. More channels may fit into the same amount of frequency spectrum if the frequency deviation of each channel is reduced. In one system, the FM broadcasting band (e.g., about 87.5-108 MHz) uses a channel spacing of about 100 kHz, with a maximum frequency deviation of about 75 kHz, leaving about a 25 kHz buffer above and below the center frequency or a channel to reduce interaction with other channels.

Figure 3:
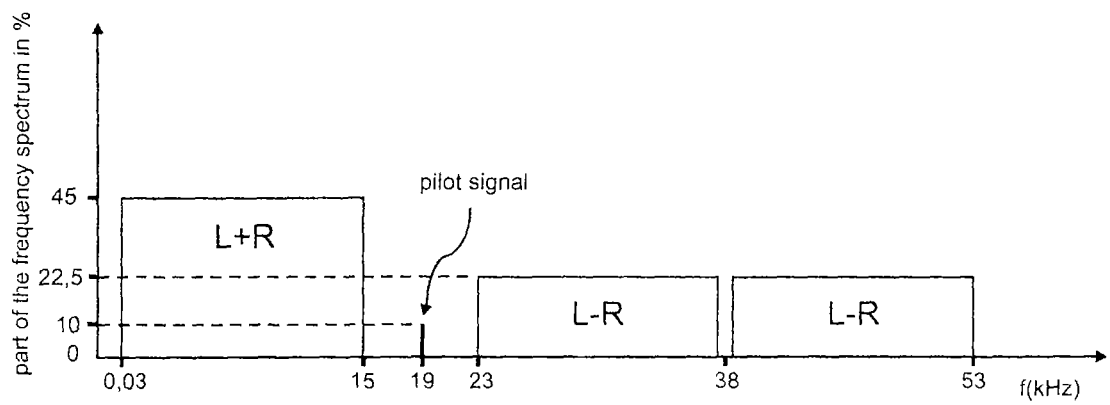
FIG. 3 illustrates the composition of an FM stereo multiplex signal that includes a mono, a stereo, and a pilot signal.

FIG. 3 illustrates the composition of an FM stereo multiplex signal that includes a mono, a stereo, and a pilot signal. Frequency modulation is widely applied for broadcasting audio signals, such as music and voice, which fall in the audio spectrum. In other systems, frequency modulation may be applied to video signalling, other applications, or other data. The full aural spectrum may range from about 20 Hz to about 20,000 Hz, but FM radio may limit the upper modulating frequency to about 15 kHz (as compared to AM radio which may limit the upper frequency to about 5 kHz).

FM-stereo broadcasting enables the audio transmission in stereo by broadcasting both the Left and the Right Channel of a Stereo Broadcast on the same FM channel. The process of combining multiple signals onto one composite signal in such a way that the original signals may be reconstituted by the receiver through Multiplexing or multiplexer. In some implementations, the lower part (about 0-15 kHz) of a Stereo Multiplexed signal (MPX) contains the sum of the Left and Right channels (e.g., L+R) to ensure compatibility with earlier Mono FM Radios.

In addition, an L−R signal may be transmitted as part of the MPX signal using a Double sideband suppressed carrier (DSBSC) modulation, which is an AM modulation, in order for the receiver to determine the Left and Right Channel. If the receiver adds the L+R signal to the L−R signal, then the resulting signal would be 2L (e.g., the Left channel signal amplified by about two times). If the receiver subtracts L+R from the L−R signal, then the resulting signal would be 2R (e.g., the Right channel signal amplified by about two times).

To transmit audio signals up to about 15 kHz with the MPX signals, a carrier frequency of the MPX signal may be higher than about 30 kHz. In one system, a carrier frequency of about 38 kHz may be chosen, whereas the actual carrier signal of about 38 kHz may be eliminated. Instead, a Pilot Signal at about 19 kHz (e.g., 38/2 kHz) may be inserted into the MPX signal, so as to inform the radio receiver that the signal is stereo and at the same time to enable the radio receiver to re-generate the about 38 kHz carrier signal with the correct phase using a simple frequency doubler.

The AM modulation of the L−R signal at the carrier frequency of about 38 kHz results in two side bands having the bandwidth of the maximum audio frequency of about 15 kHz (e.g., 23-38 kHz and 38-53 kHz). As shown in FIG. 3, the FM MPX-signal comprises the L+R (mono) signal up to about 15 kHz, a pilot signal at about 19 kHZ, and the L−R signal, which ranges from about 23 to 53 kHz. The complete FM MPX signal may be used for frequency modulating the FM carrier signal.

Figure 4:
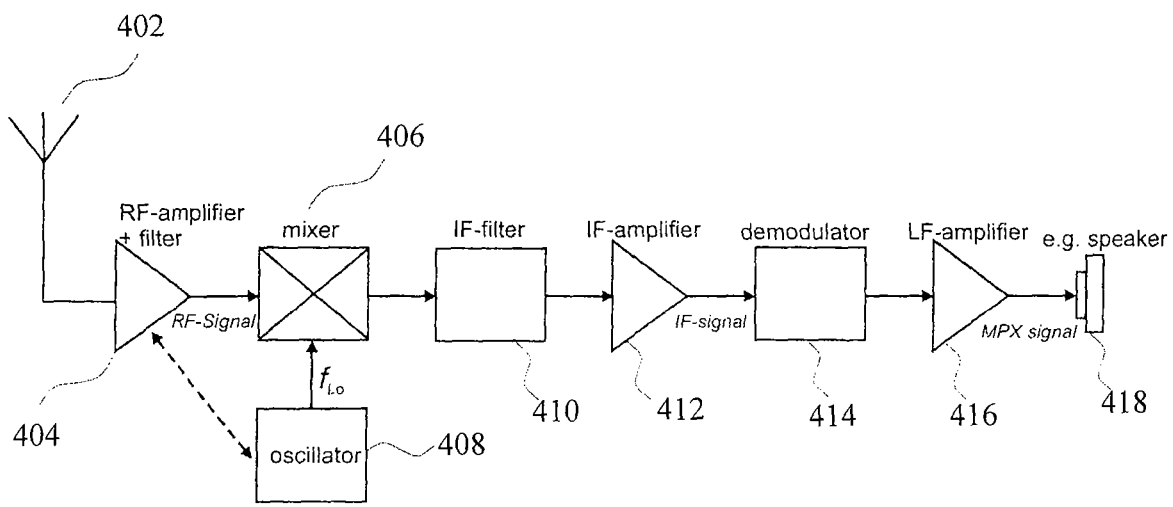
FIG. 4 is a diagram of a radio receiver.

FIG. 4 is a radio receiver. The radio receiver may be a tuned radio frequency receiver (TRF receiver) or a superheterodyne radio receiver (superhet receiver). In some receivers the frequency of the incoming signal is mixed with a locally generated signal and converted to an intermediate frequency to facilitate amplification and the rejection of unwanted signals. A tuned radio frequency receiver may include several tuned high radio frequency amplifiers followed by circuits to detect and amplify the audio signal. A three-stage TRF receiver may include an RF stage for high frequencies, a detector stage, and an audio stage. Two or three RF amplifiers may be used to filter and amplify the received frequency signal to a level sufficient to drive the detector stage. The detector converts RF signals directly to information, and the audio stage amplifies the information signal to a usable level. In tuned radio frequency receivers, the selection of the desired frequency may be based on the frequency selection of the high frequency circuitry. At high frequencies, it may be difficult to achieve good results for the selectivity because the filters may be expensive and limited in their performance.

FIG. 4 shows a superheterodyne radio or wireless receiver that uses an intermediate frequency to demodulate a radio or wireless signal. The superheterodyne receiver may be used in two way radio communication links and mobile radio communication systems. Although a superheterodyne radio receiver is described herein with respect to FIG. 4, other implementations of an adjacent channel noise detection system may use a different types of receivers.

A superheterodyne receiver uses the process of mixing to generate an intermediate frequency (IF) prior to processing that is lower than the original frequency. This may be done by (super)heterodyning, e.g., by mixing two frequencies to produce the difference frequency between the two. The superheterodyne receiver changes the RF frequency into a lower intermediate frequency that may be easier to process. This intermediate frequency may be amplified and demodulated to get the information signal.

In FIG. 4, the radio receiver may receive a frequency modulated radio signal through an input such as an antenna 402. The received radio signal may be preselected and amplified in a high frequency amplifier and filter 404. A pre-selection may ensure that only frequencies within the desired reception band are amplified, while filtering or dampening the rest.

The receiver of FIG. 4 may include a mixer 406 that mixes the RF-signal with a signal $f_{Lo}$ from a local oscillator 408, thus generating several frequencies. Depending on the quality of the mixer 406, these frequencies may include the original frequency, the sum of the original and the oscillator frequency, and the difference of the original and the oscillator frequency. The difference signal may be used as the intermediate frequency (IF). The desired reception band of the pre-selection by the RF-amplifier and filter (which includes the carrier frequency used for the frequency modulation of the RF-signal) may be controlled together with the frequency $f_{Lo}$ used at the local oscillator, so as to always achieve the same difference frequency by the mixer, i.e. the same intermediate frequency, usually e.g. ~10.7 MHz.

The intermediate frequency filter, IF-filter 410, may be a band-pass filter allowing only a small band of frequencies around its frequency to pass while substantially blocking or attenuating signals above or below the pass-band. The filtered signal output from the IF-filter 410 may be amplified by an IF-amplifier 412 for further processing in a demodulator 414. The demodulator 414 may demodulate the IF-signal to obtain an information signal (low frequency signal, LF-signal).

In some systems, the IF stages 410 and 412 may contain most of the amplification in the receiver as well as the filtering that enables signals on one frequency to be separated from those on the next frequency. Due to the lower IF-frequency, on which the processing is carried out, the amplification and filtering may be done more accurately.

Different demodulators may be used for different types of transmission, and as a result some receivers may have a variety of demodulators that may be switched in to accommodate the different types of transmission that are to be encountered. The output from the demodulator may be the recovered audio. The recovered audio is passed into the audio stages where the LF-signal may be amplified at the LF-amplifier 416 and output through an output device, such as a speaker 418 in the case where audio radio signals have been received.

In superheterodyne radios, most of the radio's signal path may only need to be sensitive to a narrow range of frequencies. In some implementations, only the front end (the part before the frequency converter stage) may need to be sensitive to a wide frequency range. For example, the front end may be sensitive to about 1-30 MHz, while the rest of the radio may be sensitive only to about 455 kHz, which is a typical IF for amplitude modulation, or to 10.7 MHz for frequency modulation. Some superheterodyne radios may have more than one frequency conversion, and may have additional circuitry to provide additional performance.

Figure 5:
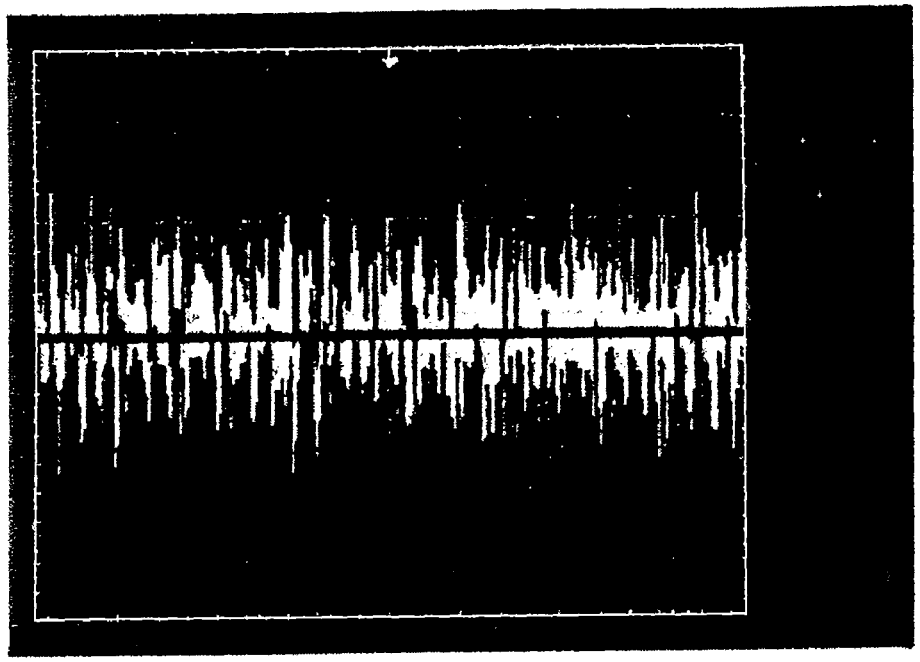
FIG. 5 shows an oscilloscope output of an FM MPX signal for which a large frequency deviation has been used for frequency modulation, but without any interference from an adjacent channel.
Figure 6:
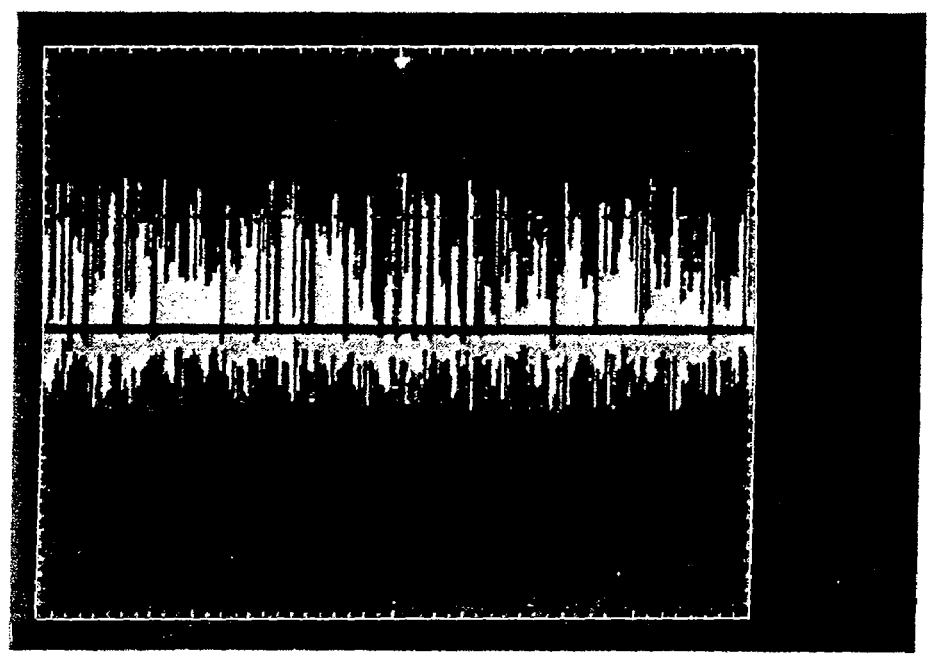
FIG. 6 shows another oscilloscope output of an FM MPX signal for which a frequency deviation has been used for frequency modulation, but including interference from an adjacent channel.

FIG. 5 shows an oscilloscope output of an FM MPX signal, for which a large frequency deviation has been used for frequency modulation. The FM MPX signal of FIG. 5 does not suffer from any significant interference from an adjacent channel. FIG. 6 shows another oscilloscope output of an FM MPX signal, for which a "normal" frequency deviation has been used for frequency modulation. The FM MPX signal of FIG. 5 however includes interference from an adjacent channel. In some implementations, the FM MPX signal may be cleaned by blanking out some of the possible interferences before attempting to detect noise from an adjacent channel.

The horizontal line in both FIGS. 5 and 6 is at 0 Volt, thus dividing the MPX-signal into a lower part and an upper part, e.g., negative and positive part. The MPX signals of FIGS. 5 and 6 have about the same maximum deviation difference. In other words, the distance between the most negative and the most positive amplitude is about the same. However, while the MPX signal of FIG. 5 is substantially symmetrical with respect to the 0V line, the MPX signal of FIG. 6 is asymmetrical with respect to the 0V line. Therefore, when the amount of deviation in the negative direction and the positive direction are determined separately and compared to one another, it is possible to distinguish between a situation where a large frequency deviation was used for frequency modulation (FIG. 5) and a situation where a lower frequency deviation was used for frequency modulation, but the signal includes interference from an adjacent channel (FIG. 6).

In FIG. 6 the negative part of the MPX signal represents the employed frequency deviation of the used frequency modulation. Compared thereto, the positive part of the MPX-signal of FIG. 6 is significantly larger due to interference from an adjacent channel. In this example, the carrier frequency of the adjacent channel may be larger than the carrier frequency of the radio signal, since it is the positive part of the MPX signal that is larger. In other implementations, the system may be applied to detect interference from an adjacent channel at a lower carrier frequency than the desired radio signal. In that case, the negative part of the MPX signal would be larger than the positive part (not shown).

Figure 7:
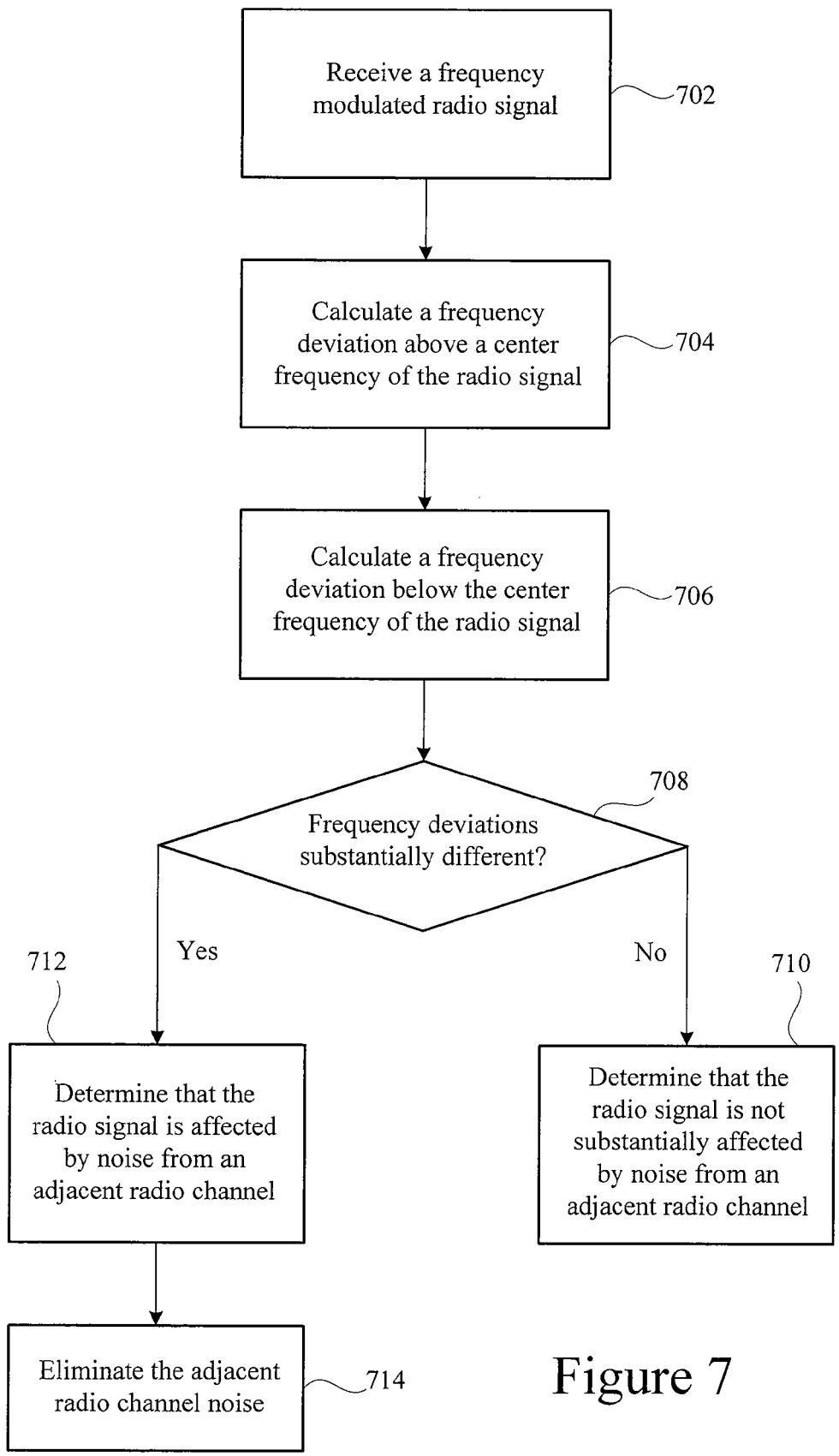
FIG. 7 illustrates a method of determining whether a signal is affected by noise from an adjacent radio channel.

FIG. 7 illustrates a method of determining whether a signal is affected by noise from an adjacent radio channel. The method of FIG. 7 separately determines the frequency deviation above and below the carrier/intermediate frequency so as to detect noise from an adjacent channel. When the frequency deviation above the carrier/intermediate frequency is substantially different from the one below the carrier/intermediate frequency, it may be determined that the radio signal is affected by noise from an adjacent channel. In comparison, a large frequency deviation without adjacent channel noise would generate essentially the same frequency deviation above and below the carrier/intermediate frequency. Therefore, noise from an adjacent channel may be easily distinguished from a large frequency deviation.

Adjacent channel noise may be detected by separately determining the positive $f_{max}$ and negative part $f_{min}$ of the frequency deviation of the frequency modulated signal and then comparing the absolute values of the positive and negative part with one another. For noise coming from an adjacent channel, the frequencies do not deviate from the carrier frequency in a symmetrical fashion, but with a tendency to the frequency of the adjacent channel's carrier frequency. In other words, one of the positive or the negative parts of the frequency deviation may be substantially larger than the other. In contrast, large frequency deviations may be symmetrical and may thus exhibit the same amount of positive $f_{max}$ and negative frequency deviation $f_{min}$ in general. Therefore, when the amount of frequency deviation is large and the positive and negative parts are more or less identical or substantially identical, the method (or system) may infer that a large frequency deviation is used for frequency modulating the radio signal, but that the signal does not include substantial adjacent channel noise.

In the method of FIG. 7, a frequency modulated radio signal is received at act 702. At act 704, a frequency deviation (Δf) above a center frequency of the radio signal is calculated over a pre-determined part of the radio signal. The center frequency may be an intermediate frequency, obtained by mixing a carrier frequency of the radio signal with a pre-determined second frequency, or a carrier frequency of the radio signal. At act 706, a frequency deviation below the center frequency of the radio signal is calculated over a pre-determined part of the radio signal. At act 708, the two calculated frequency deviations are compared to each other to determine whether the extents of the two frequency deviations are substantially different. In one method, the difference between the two frequency deviations may be substantially different when they differ by more than a predetermined amount. The predetermined amount may be determined through testing various thresholds against signals that are known to contain adjacent channel noises and other signals known to be substantially free from adjacent channel noises. If the extents of the two frequency deviations are not substantially different, then it may be determined at act 710 that the received radio signal is not substantially affected by noise from an adjacent radio channel. However, if the extents of the two frequency deviations are substantially different, then it may be determined at act 712 that the radio signal is affected by noise from an adjacent radio channel. In this situation, it may be desirable to eliminate some or all of the detected adjacent channel noise from the received signal at act 714. In one implementation, the detected adjacent channel noise may be substantially reduced or eliminated by setting a band-pass filter or other type of filter coupled to or integrated with a receiver to filter out at least some portions of the detected adjacent channel noise.

In the method of FIG. 7, a signal with a large frequency deviation from the center frequency may be distinguished from a signal affected by noise from an adjacent radio channel. When the frequency deviation extent below the center frequency is substantially the same as the frequency deviation extent above the center frequency, it may be determined that the radio signal has a large frequency deviation without adjacent channel noise.

Figure 8:
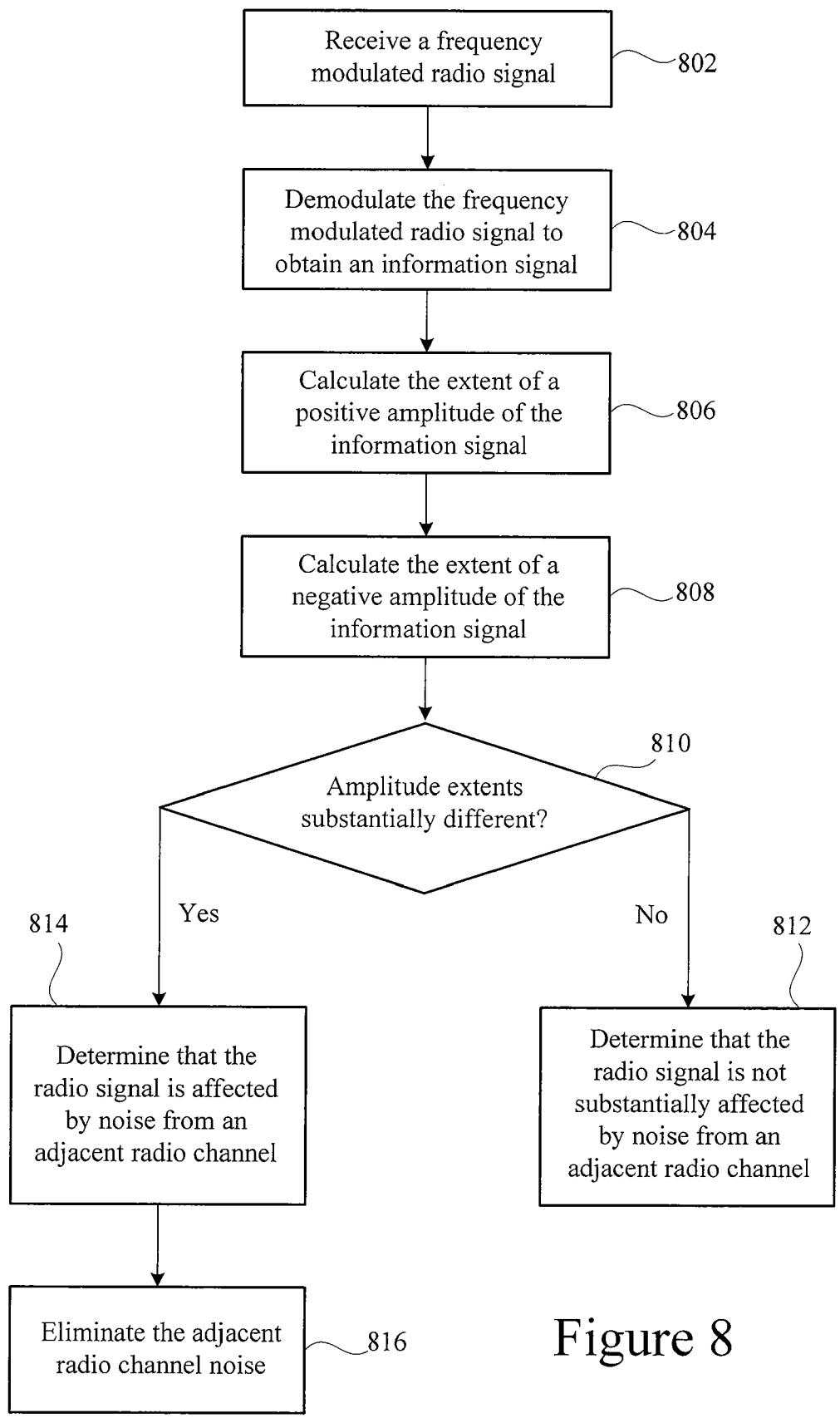
FIG. 8 illustrates another method of determining whether a signal is affected by noise from an adjacent radio channel.

FIG. 8 illustrates an alternative method of determining whether a signal is affected by noise from an adjacent radio channel. In this implementation, the adjacent noise detection signal analysis may be performed on a demodulated signal rather than an encoded signal such as the received FM radio signal. The demodulated signal may be the MPX signal generated by the demodulator 414 of FIG. 4. In some implementations, performing the adjacent noise detection signal analysis on the demodulated signal may be more efficient and/or less complex. The amplitude of the demodulated signal depends on the frequency deviation of the frequency modulated radio signal. Based on this dependency, it is possible to detect adjacent channel noise by analyzing the received FM signal and/or a demodulated version (e.g., the analogous MPX signal) of the received FM signal. FIGS. 5 and 6 illustrate one implementation of the analysis of the demodulated MPX signal.

In frequency modulation, the extent of the frequency deviation corresponds to the amplitude of the demodulated signal. Therefore, it is possible to determine the presence of noise from an adjacent channel by separately determining the positive and negative amplitude of the demodulated FM MPX signal and by then comparing same with each other. When the positive amplitude is substantially different from the negative amplitude, the radio signal is affected by noise from an adjacent channel. By determining the positive part and the negative part of the MPX signal and comparing them (e.g., through a comparator), it is possible to reliably detect interference from an adjacent channel. Furthermore, it is thus possible to easily distinguish between a large frequency deviation used for frequency modulation and the interference from adjacent channels.

In the method of FIG. 8, a frequency modulated radio signal is received at act 802. At act 804, frequency modulated radio signal is demodulated to obtain an information signal, such as an MPX signal. At act 806, the amplitude of a positive component of the information signal is calculated over a pre-determined part of the radio signal. At act 808, the amplitude of a negative component of the information signal is calculated over a pre-determined part of the radio signal. In some implementations, interferences of the radio signal may be blanked out before determining the extent of positive and negative amplitudes. At act 810, the two calculated amplitudes are compared to each other to determine whether the extents of the two frequency deviations are substantially different. In one implementation, the difference between the two amplitudes may be substantially different when they differ by more than a predetermined amount. The predetermined amount may be determined through testing various thresholds against signals that are known to contain adjacent channel noises and other signals known to be substantially free from adjacent channel noises. If the extents of the two amplitudes are not substantially different, then it may be determined at act 812 that the received radio signal is not substantially affected by noise from an adjacent radio channel. However, if the extents of the two amplitudes are substantially different, then it may be determined at act 814 that the radio signal is affected by noise from an adjacent radio channel. In this situation, it may be desirable to eliminate some or all of the detected adjacent channel noise from the received signal at act 816. In one system, the detected adjacent channel noise may be substantially reduced or eliminated by setting a band-pass filter or other attenuator of a radio receiver to filter out at least some portions of the detected adjacent channel noise.

In the method of FIG. 8, a signal with a large frequency deviation from the center frequency may be distinguished from a signal affected by noise from an adjacent radio channel. When the extent of the positive amplitude is substantially the same as the extent of the negative amplitude, it may be determined that the radio signal has a large frequency deviation without adjacent channel noise. In one system, the difference between the extent of the positive amplitude and the negative amplitude may be compared against a threshold. When the threshold is exceeded, it may be determined that the radio signal has a large frequency deviation.

Figure 9:
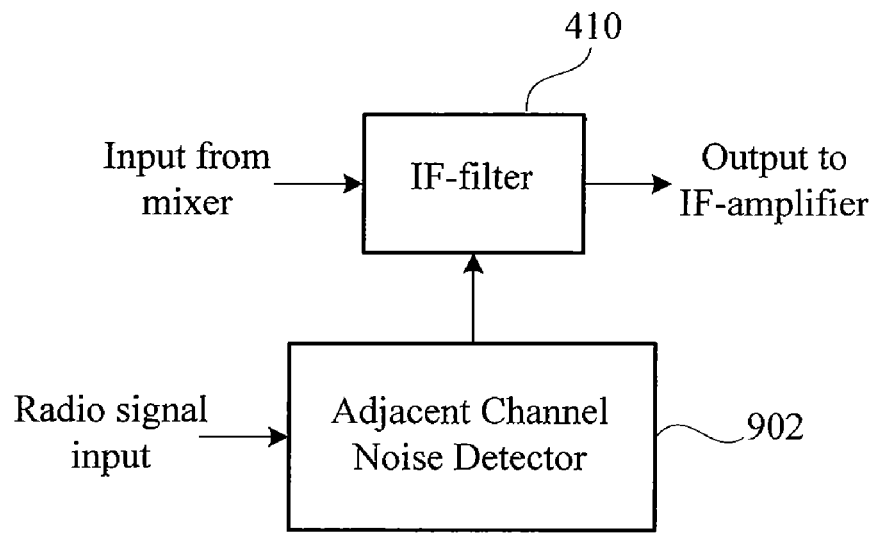
FIG. 9 illustrates an adjacent channel noise detector.

FIG. 9 illustrates an adjacent channel noise detector 902. The adjacent channel noise detector 902 may be part of a radio receiver. In one implementation, the adjacent channel noise detector 902 may serve as a controller for the IF-filter 410 of the radio receiver of FIG. 4. The adjacent channel noise detector 902 may reliably identify noise coming from adjacent channels and thus allows a radio receiver to distinguish adjacent channel noise situations from large frequency deviations or other situations where IF frequency bandwidth adaption may not be desirable.

In superheterodyne receivers, the selectivity of the receiver may be determined by the IF stages, such as at the IF-filter 410. Therefore, in some systems, superheterodyne receivers may achieve better selectivity than a TRF receiver. Selectivity is a measure of the performance of a radio receiver to respond only to the tuned transmission (such as a radio station channel) and reject other signals nearby (such as another broadcast on an adjacent channel). Many of the filters used in radio receivers have very high levels of performance and enable radio receivers to select individual signals even in the presence of many close-by other signals.

Even though superheterodyne receivers may have a high level of selectivity, radio signals from adjacent channels may still pass the pre-selection stage and the IF-filter stage and lead to noise in the demodulated information signal. The selected bandwidth of the IF-filter stage may be controlled for achieving a good selectivity, low distortion, and possibly other characteristics. In order to attenuate interferences from a nearby station on an adjacent frequency, the bandwidth of the IF-filter 410 may be narrowed. However, by doing so at the same time the distortion of the demodulation signals increases with the narrower bandwidth of the IF-filter stage. Conversely, a wider bandwidth attenuates demodulation signal distortion and thus may improve tone quality, but renders the receiver more susceptible to interference, especially if an input signal is weak or a high power nearby station is present.

A radio receiver may be able to switch between at least two different bandwidths for the IF-filter 410, in order to take advantage of both aspects. If no interference from an adjacent channel is present in the radio signal, then the frequency bandwidth of the IF-filter 410 may be maintained wide to lower the distortions. However, if an adjacent channel causes noise in the radio signal, then the frequency bandwidth of the IF-filter 410 may be narrowed so as to filter out the interference from the adjacent channel.

A reliable determination of whether an adjacent channel is indeed generating noise in the radio signal is helpful to avoid false noise detections. In some implementations, switching the frequency bandwidth in the intermediate filter may do more harm than good. In order to attenuate noise coming from an adjacent radio station, it may be helpful to determine when the signal is indeed affected by noise, and when not, and when noise is present, to eliminate the noise as much as possible. When a radio signal is wrongly determined to have interference from an adjacent channel or another source, the means for eliminating the interference may unnecessarily worsen the quality of the received signal. The impact of the wrongly applied noise elimination varies depending on the kind of noise elimination used.

A receiver may have a detector for detecting the level of noise in a demodulated signal such as the FM demodulated signal. There are different approaches to identify noise from adjacent channels. A noise blanker or a multipath detector may be coupled to the signal path of the receiver. However, these detectors for noise may also respond to large frequency deviations which are misjudged as noise. Therefore, for signals which have large frequency deviations but no noise, the frequency bandwidth of the IF filter may also be narrowed thus leading to a worse sound quality of the signal, e.g. having a great amount of distortion. This may be particularly disadvantageous for areas, such as in eastern Europe, where larger frequency deviations are often used. The frequency deviation is usually limited to e.g., about 75 kHz in the FM band, whereas in eastern Europe frequency deviations up to about 300 kHz may be encountered. These wide frequency deviations may lead to malfunctions of conventional noise detection.

The adjacent channel noise detector 902 of FIG. 9 may determine whether a received frequency modulated radio signal includes interference from an adjacent channel. The adjacent channel noise detector 902 may identify the presence of adjacent channel noise by comparing a frequency deviation above the center frequency of the received signal to a frequency deviation below the center frequency of the received signal, as described in FIG. 7. Alternatively or additionally, the adjacent channel noise detector 902 may identify the presence of adjacent channel noise by comparing a positive amplitude and a negative amplitude of a demodulated version of the frequency modulated radio signal, as described in FIG. 8.

In one system, the IF-filter 410 may implement a band pass filter with a pre-determined frequency band around the center frequency of the radio signal. The band pass filter may filter noise from an adjacent radio channel out of the radio signal. When it is determined that the radio signal is affected by noise from an adjacent radio channel, the band pass filter may be changed from the pre-determined frequency band to a second frequency band around the center frequency, where the second frequency band is narrower than the pre-determined frequency band. When it is determined that the radio signal has a large frequency deviation without adjacent channel noise, the pre-determined frequency band of the band pass filter may be maintained at the wider band and not changed. In other words, the adjacent channel noise detector 902 may select a relatively narrow pass band for the IF-filter 410 when adjacent channel noise is detected, but keep a relatively wide pass band for the IF-filter 410 when it is determined that the received signal is not affected by adjacent channel noise.

When used in a superheterodyne receiver, the adjacent channel noise detector 902 may control the bandwidth of the IF-filter 410 in response to a determination of whether the received signal contains adjacent channel noise. The adjacent channel noise detector 902 may improve the usage of dynamic selection in the radio receiver to filter out noise from adjacent channels. In one implementation, the adjacent channel noise detector 902 may lock the narrowing of the filter bandwidth for the intermediate frequency filter 410. More specifically, the bandwidth of the IF-filter 410 may be made smaller when noise is detected, so as to attenuate the noise. However, this may not desirable for large frequency deviations which are wrongly determined as noise.

In other implementations, the adjacent channel noise detector 902 may be used to lock the control of the IF-filter frequency bandwidth. In more detail, the usual noise determination may be applied to the radio signal to control the frequency bandwidth of the IF-filter 410. In addition, the adjacent channel noise detection of FIG. 7 and/or FIG. 9 may be carried out as well, so as to lock the frequency bandwidth of the IF filter 410 to prevent the frequency bandwidth change when a noise determination wrongly determines the presence of noise in the radio signal, such as in a situation when a large frequency deviation is used for frequency modulation of the radio signal but adjacent channel noise is not present. Therefore, the adjacent channel noise detector 902 may control the IF filter 410, such as by dynamically changing the frequency bandwidth of the filter (or selecting a separate filter having a different filter characteristic), in an improved way, so as to avoid a situation where the bandwidth of the filter is wrongly narrowed. Therefore, the adjacent channel noise detector 902 may prevent deteriorated signal quality.

Figure 10:
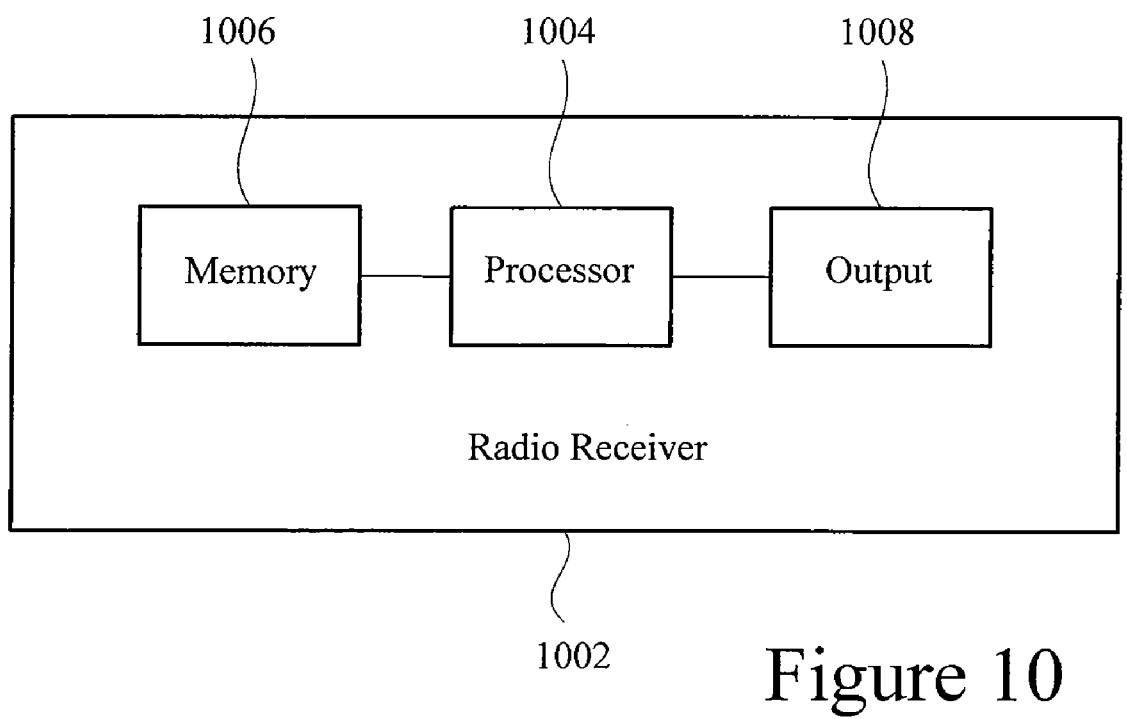
FIG. 10 is an alternative receiver.

FIG. 10 illustrates a radio receiver 1002. As shown in FIG. 10, the radio receiver 1002 may include a signal processor 1004, a local or distributed memory 1006, and an output 1008, such as a transmitter, speaker, or device driver, or other output device. The processor 1004 may execute instructions stored at the memory 1006 to implement the processes described herein to emulate the circuitry of FIG. 4 or execute some or all of the processes described to identify and/or eliminate adjacent channel noise from a received signal. In some systems, the signal processor 1004, the memory 1006, and the output 1008 may implement the adjacent channel noise detector 902 of FIG. 9 and/or various features of the radio receiver described herein.

Each of the processes described may be encoded in a computer-readable medium such as a memory, programmed within a device such as one or more circuits, one or more processors or may be processed by a controller or a computer. If the processes are performed by software, the software may reside in a memory resident to or interfaced to a storage device, a communication interface, or non-volatile or volatile memory in communication with a mobile or static transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for receiving a frequency modulated radio signal on a radio channel at a center frequency and determining whether the radio channel is affected by noise from an adjacent radio channel, a result of the determination being usable for an elimination of the noise in the radio signal, the method comprising the steps of:
   determining over a pre-determined part of the frequency modulated radio signal an extent of a frequency deviation above the center frequency and an extent of a frequency deviation below the center frequency; and
   determining that the radio signal is affected by the noise from the adjacent radio channel based on an identification that the frequency deviation extent below the center frequency is substantially different from the frequency deviation extent above the center frequency.

2. The method of claim 1, where a band pass filter with a pre-determined frequency band around the center frequency of the radio signal is provided to filter the noise from the adjacent radio channel out of the radio signal, the method further comprising:
   changing the band pass filter to a second frequency band around the center frequency based on the identification that the frequency deviation extent below the center frequency is substantially different from the frequency deviation extent above the center frequency, where the second frequency band is narrower than the pre-determined frequency band.

3. The method of claim 2, further comprising:
   maintaining the pre-determined frequency band of the band pass filter when it is determined that the radio signal has a large frequency deviation.

4. The method of claim 1, further comprising:
   distinguishing a large frequency deviation of the radio signal off the center frequency from the noise from the adjacent radio channel affecting the radio signal; and
   determining that the radio signal has a large frequency deviation based on an identification that the frequency deviation extent below the center frequency is substantially the same as the frequency deviation extent above the center frequency.

5. The method of claim 1, where the center frequency is an intermediate frequency, obtained by mixing a carrier frequency of the radio signal with a pre-determined second frequency, or a carrier frequency of the radio signal.

6. The method of claim 1, where the act of determining that the radio signal is affected by noise comprises determining by a superheterodyne radio receiver that the radio signal is affected by the noise from the adjacent radio channel.

7. A method for receiving a frequency modulated radio signal on a radio channel and determining whether the radio channel is affected by noise from an adjacent radio channel, a result of the determination being usable to eliminate the noise in the radio signal, the method comprising the steps of:
   demodulating the radio signal into an information signal;
   determining over a pre-determined part of the information signal an extent of a positive amplitude of the information signal and an extent of a negative amplitude of the information signal; and
   determining that the radio signal is affected by the noise from the adjacent radio channel based on an identification that the extent of the positive amplitude is substantially different from the extent of the negative amplitude.

8. The method of claim 7, where a band pass filter with a pre-determined frequency band around a center frequency of the radio signal is provided to filter the noise from the adjacent radio channel out of the radio signal, the method further comprising:
   changing the band pass filter to a second frequency band around the center frequency based on the identification that the extent of the positive amplitude is substantially different from the extent of the negative amplitude, where the second frequency band is narrower than the pre-determined frequency band.

9. The method of claim 7, further comprising:
   distinguishing a large frequency deviation off the center frequency used for frequency modulating the radio signal from the noise from the adjacent radio channel affecting the radio signal; and
   determining that the radio signal has a large frequency deviation based on an identification that the extent of the positive amplitude is substantially the same as the extent of the negative amplitude.

10. The method of claim 7, further comprising:
    calculating a difference between the extent of the positive amplitude and the extent of the negative amplitude;
    comparing the difference against a threshold; and
    determining that the radio signal has a large frequency deviation based on an identification that the difference exceeds the threshold.

11. The method of claim 7, where interferences of the radio signal are blanked out before determining the extent of the positive amplitude and the extent of the negative amplitude.

12. The method of claim 7, where the act of determining that the radio signal is affected by noise comprises determining by a superheterodyne radio receiver that the radio signal is affected by the noise from the adjacent radio channel.

13. A method for determining whether a radio signal is affected by adjacent channel noise, the method comprising the steps of:
receiving, at a radio receiver, a frequency modulated radio signal on a radio channel at a center frequency;
calculating an extent of a frequency deviation above the center frequency over a pre-determined part of the frequency modulated radio signal;
calculating an extent of a frequency deviation below the center frequency over a pre-determined part of the frequency modulated radio signal;
comparing the extent of the frequency deviation above the center frequency to the extent of the frequency deviation below the center frequency;
determining, by the radio receiver, that the frequency modulated radio signal is affected by noise from an adjacent radio channel based on an identification that the extent of the frequency deviation below the center frequency deviates from the extent of the frequency deviation above the center frequency by more than a predetermined amount.

14. The method of claim 13, further comprising:
eliminating, from the frequency modulated radio signal, the noise from the adjacent radio channel based on the identification that the extent of the frequency deviation below the center frequency deviates from the extent of the frequency deviation above the center frequency by more than the predetermined amount.

15. The method of claim 13, where a band pass filter with a pre-determined frequency band around the center frequency of the radio signal is provided to filter noise from an adjacent radio channel out of the radio signal, the method further comprising:
changing the band pass filter to a second frequency band around the center frequency based on the identification that the extent of the frequency deviation below the center frequency deviates from the extent of the frequency deviation above the center frequency by more than the predetermined amount, where the second frequency band is narrower than the pre-determined frequency band.

16. A method for determining whether a radio signal is affected by adjacent channel noise, the method comprising the steps of:
receiving, at a radio receiver, a frequency modulated radio signal on a radio channel;
demodulating the radio signal into an information signal;
calculating an extent of a positive amplitude of the information signal over a pre-determined part of the information signal;
calculating an extent of a negative amplitude of the information signal over a pre-determined part of the information signal;
comparing the extent of the positive amplitude to the extent of the negative amplitude;
determining, by the radio receiver, that the frequency modulated radio signal is affected by noise from an adjacent radio channel based on an identification that the extent of the positive amplitude deviates from the extent of the negative amplitude by more than a predetermined amount.

17. The method of claim 16, further comprising:
eliminating, from the frequency modulated radio signal, the noise from the adjacent radio channel based on the identification that the extent of the positive amplitude deviates from the extent of the negative amplitude by more than the predetermined amount.

18. The method of claim 16, where a band pass filter with a pre-determined frequency band around a center frequency of the radio signal is provided to filter the noise from the adjacent radio channel out of the radio signal, the method further comprising:
changing the band pass filter to a second frequency band around the center frequency based on the identification that the extent of the positive amplitude deviates from the extent of the negative amplitude by more than the predetermined amount, where the second frequency band is narrower than the pre-determined frequency band.

19. A radio receiver, comprising:
an input configured to receive a frequency modulated radio signal on a radio channel at a center frequency; and
an adjacent radio channel noise detector configured to identify noise from an adjacent channel in the frequency modulated radio signal;
where the adjacent channel noise detector is configured to calculate:
an extent of a frequency deviation above the center frequency over a pre-determined part of the frequency modulated radio signal; or
an extent of a positive amplitude of an information signal over a pre-determined part of the information signal, where the information signal comprises a demodulated version of the frequency modulated radio signal;
where the adjacent channel noise detector is configured to calculate:
an extent of a frequency deviation below the center frequency over a pre-determined part of the frequency modulated radio signal; or
an extent of a negative amplitude of the information signal over a pre-determined part of the information signal;
where the adjacent channel noise detector is configured to compare:
the extent of the frequency deviation above the center frequency to the extent of the frequency deviation below the center frequency; or
the extent of the positive amplitude to the extent of the negative amplitude;
where the adjacent channel noise detector is configured to determine that the frequency modulated radio signal is affected by the noise from the adjacent radio channel based on an identification that:
the extent of the frequency deviation below the center frequency deviates from the extent of the frequency deviation above the center frequency by more than a first predetermined amount; or
the extent of the positive amplitude deviates from the extent of the negative amplitude by more than a second predetermined amount.

20. The radio receiver of claim 19, where the adjacent channel noise detector is configured to calculate the extent of the frequency deviation above the center frequency over the pre-determined part of the frequency modulated radio signal, where the adjacent channel noise detector is configured to calculate the extent of the frequency deviation below the center frequency over the pre-determined part of the frequency modulated radio signal, where the adjacent channel noise detector is configured to compare the extent of the frequency deviation above the center frequency to the extent of the frequency deviation below the center frequency, and where the adjacent channel noise detector is configured to determine that the frequency modulated radio signal is affected by noise from an adjacent radio channel based on the identification that the extent of the frequency deviation below the center frequency deviates from the extent of the frequency deviation above the center frequency by more than the first predetermined amount.

21. The radio receiver of claim 19, where the adjacent channel noise detector is configured to calculate the extent of the positive amplitude of the information signal over the pre-determined part of the information signal, where the adjacent channel noise detector is configured to calculate the extent of the negative amplitude of the information signal over the pre-determined part of the information signal, where the adjacent channel noise detector is configured to compare the extent of the positive amplitude to the extent of the negative amplitude, and where the adjacent channel noise detector is configured to determine that the frequency modulated radio signal is affected by noise from an adjacent radio channel based on the identification that the extent of the positive amplitude deviates from the extent of the negative amplitude by more than the second predetermined amount.

22. The radio receiver of claim 19, further comprising a band pass filter with a pre-determined frequency band around the center frequency of the radio signal, where the band pass filter is configured to filter the noise from the adjacent radio channel out of the radio signal;

where the adjacent channel noise detector is configured to change the band pass filter to a second frequency band around the center frequency in response to a determination that:

the extent of the frequency deviation below the center frequency deviates from the extent of the frequency deviation above the center frequency by more than the first predetermined amount; or the extent of the positive amplitude deviates from the extent of the negative amplitude by more than the second predetermined amount; and where the second frequency band is narrower than the pre-determined frequency band.

23. The radio receiver of claim 22, where the adjacent channel noise detector is configured to maintain the pre-determined frequency band of the band pass filter in response to a determination that:

the extent of the frequency deviation below the center frequency deviates from the extent of the frequency deviation above the center frequency by less than the first predetermined amount; or the extent of the positive amplitude deviates from the extent of the negative amplitude by less than the second predetermined amount.

\* \* \* \* \*